United States Patent
Lowe

[15] 3,661,176
[45] May 9, 1972

[54] LEVELING VALVE

[72] Inventor: Charles B. Lowe, Parklands, England

[73] Assignee: Universal Oil Products Company, Des Plaines, Ill.

[22] Filed: Aug. 27, 1970

[21] Appl. No.: 67,462

[30] Foreign Application Priority Data

Sept. 3, 1969 Great Britain.....................43,602/69

[52] U.S. Cl...........................137/560, 297/DIG. 3, 248/400, 188/266
[51] Int. Cl...........................................................F16d 63/00
[58] Field of Search.............137/560; 188/1, 266, 280, 298; 297/339, 347, DIG. 3; 267/114; 248/400

[56] References Cited

UNITED STATES PATENTS

| 2,961,233 | 11/1960 | Ullrich | 188/298 X |
| 3,265,345 | 8/1966 | Vuichard | 248/400 |
| 3,335,996 | 8/1967 | Hall et al. | 248/400 |
| 3,430,444 | 3/1969 | Kamp | 248/400 X |
| 3,561,570 | 2/1971 | Sundermann | 188/1 B |

*Primary Examiner*—Henry T. Klinksiek
*Attorney*—James R. Hoatson, Jr. and Philip T. Liggett

[57] ABSTRACT

A leveling valve for use in an air-suspension system of a vehicle seat. An air-flow control valve is operated by displacement of a seat part. A damper, comprised of a roller biased laterally into a flexible tube containing fluid and traveling parallel to the tube introduces a delay into the operation of the leveling valve in response to movement of the seat part.

7 Claims, 4 Drawing Figures

INVENTOR
Charles B. Lowe

PATENTED MAY 9 1972

INVENTOR
Charles B. Lowe

BY: James R. Hoatson, Jr.
Philip T. Liggett
ATTORNEYS

LEVELING VALVE

This invention relates to a leveling valve for use, in particular, in an air-suspension system of a vehicle seat.

In such an air-suspension system which includes an air spring, the level of the seat part under static load can be adjusted to suit the weight of the seat occupant by leaking air out of the air spring or introducing air into the air spring. This is achieved by means of a leveling valve which comprises an airflow control valve operated by displacement of the seat part, and a damper mechanism to introduce a delay in the response of the control valve to movement of the seat part. In other words, the leveling valve is intended to permit the control valve to respond to changes in mean ride level (due to a change in occupant load) without responding to ride oscillations of the seat part. This damper mechanism can comprise a hydraulic piston working in a cylinder with controlled leakage of the hydraulic fluid, but such a damper mechanism requires close tolerances, and therefore is difficult and costly to manufacture.

According to the present invention there is provided a leveling valve for use in an air-suspension system of a vehicle seat, comprising an actuating member movable in response to upward and downward movement of a seat part of the vehicle seat relative to a base part thereof, a closed flexible tube containing a fluid, a roller arranged to roll along the outside of the tube and biased to press against and indent the tube thus forming a constriction in the tube, said constriction being effective to restrict flow of the fluid along the tube and thereby damp the movement of the roller along the tube, a spring coupling connecting the roller to said actuating member, and an air-supply valve having a flow control member responsive to the position of the roller to control the flow of air through the valve.

The present invention also provides a leveling valve, for use in an air-suspension system of a vehicle seat, comprising an air-supply valve having a flow control member, an actuating member movable in response to upward and downward movement of a seat and connected to the flow control member of the valve via a spring coupling, and a damper connected to the flow control member and operative to load the spring coupling, the damper comprising a fluid container having a flexible wall and a variable constriction dividing the interior of the container into two chambers, and actuating means movable with the flow control member to flex said wall and thereby cause fluid to flow through said constriction and so damp any sudden movement of the flow control member.

One form of improved leveling valve in accordance with the present invention will now be described with reference to the accompanying drawings in which.

Figure 1:
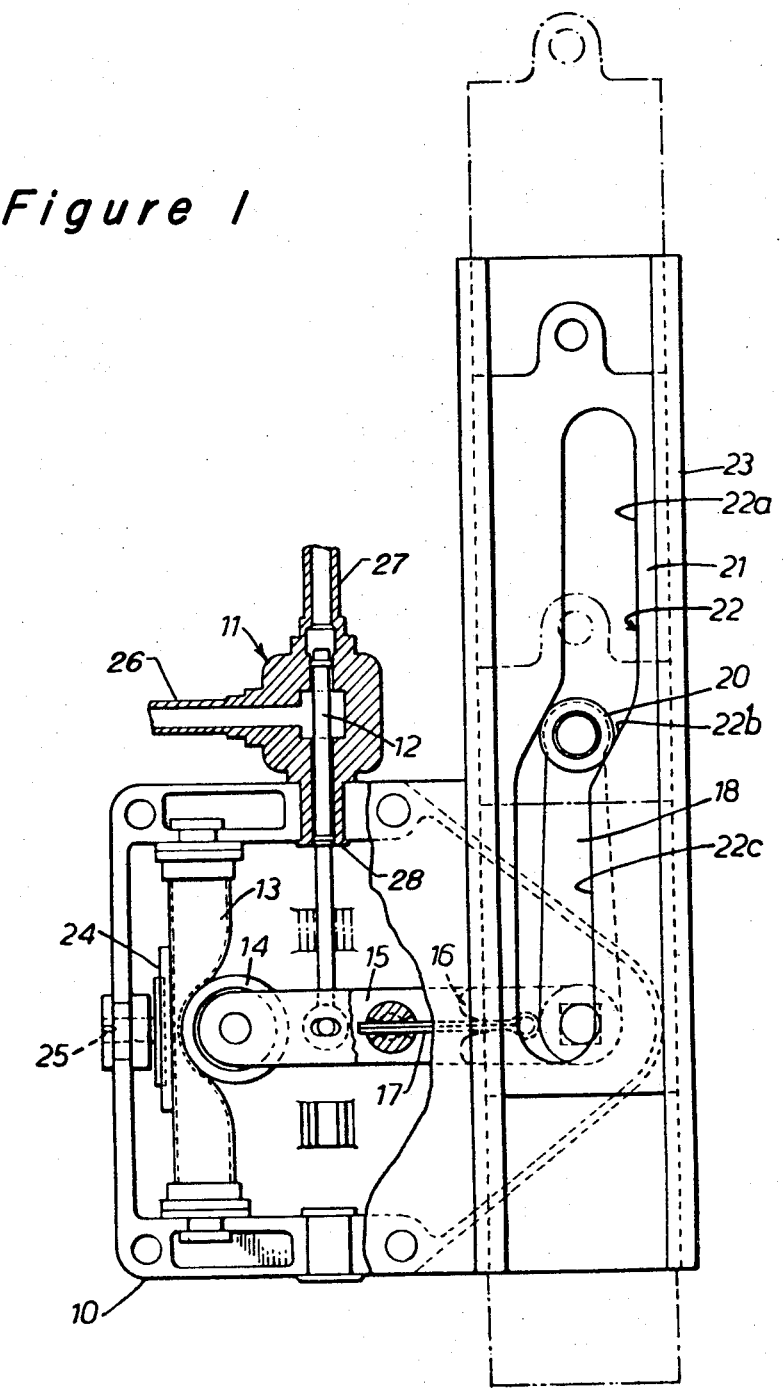
FIG. 1 is a partial section through the leveling valve, showing its connection to part of a pneumatic suspension system.
Figure 2:
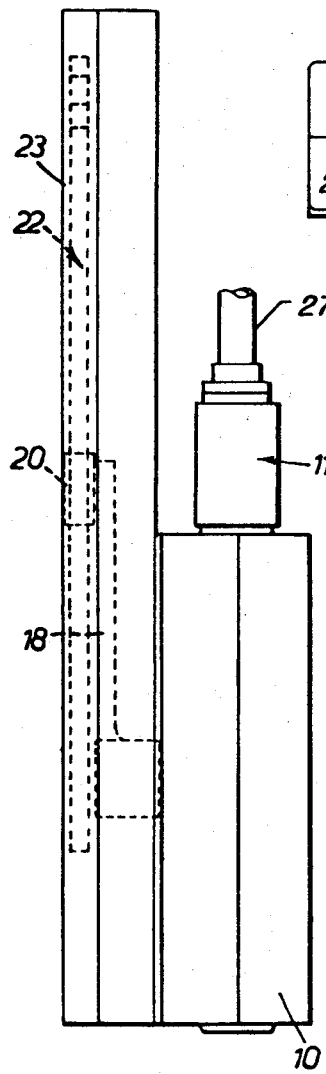
FIGS. 2 and 3 are respectively an end elevation and a plan view of the mechanism shown in FIG. 1; and, FIG. 4 is a detail of a portion of the mechanism shown in FIG. 1.
Figure 3:
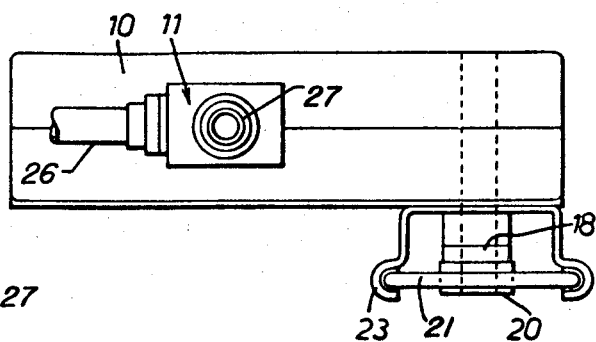
Figure 4:
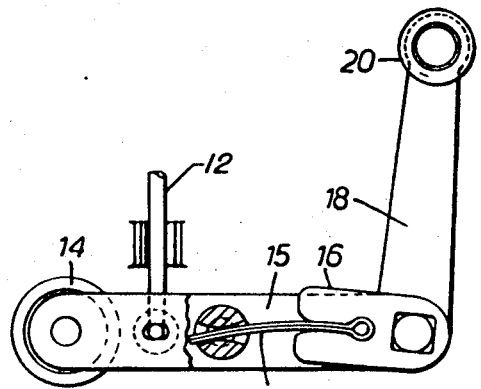

The leveling valve shown in the drawings comprises a housing 10 in which an air-flow control slide valve 11 is mounted in one wall of the housing with the flow control slide member 12 of the valve extending through the housing and being slidably supported in an opposite wall thereof. The flow control slide member 12 is movable between a position in which it connects a compressed air inlet 26 with an air flow outlet 27 to the seat and a position in which it connects air inlet 26 with a vent 28 to the atmosphere.

The damper mechanism comprises a flexible tube 13, in particular of plastics material, which provides a peristaltic action in combination with a compression roller 14, an actuating means, guided to roll along the tube. The tube, which contains a fluid, is sealed at its opposite ends so that as the roller rolls along the tube, compressing it to leave only a very narrow gap between its opposite walls through which the fluid can pass, the movement of the roller is opposed by the constriction of the tube which impedes the escape of fluid from that portion of the tube which the roller is approaching.

The roller is mounted at one end of a support arm 15 which is pivoted at its opposite end, and an actuating arm 16, pivoted on the same axis, is connected to the support arm 15 through a leaf spring 17 such that as the actuating arm 16 is rotated in one direction or the other from a neutral position, the leaf spring is loaded to apply a biasing force in the same direction to the roller-supporting arm 15 and thus bias the roller towards one or other end of the peristaltic tube. The roller-supporting arm, in its central position, is perpendicular to the slide member 12 of the slide valve 11 and is pivoted thereto at the cross-over point. In particular the roller-supporting arm is formed by a pair of parallel spaced plates between which the slide member extends.

A control coupling for transmitting the motion of the seat part to the actuating arm comprises an actuating member 18 rigid with, and perpendicular to, the actuating arm 16, having, at its outer end, a guide roller 20 which is movable along a cam slot 22 in a cam plate 21, the cam plate being mounted in a guide 23 for movement in opposite directions along the guide in response to upward and downward movement of the seat part. The elongated cam slot in the plate comprises two straight slot portions 22a and 22c which are parallel to one another and extend longitudinally of the plate (but do not overlap) and an intermediate straight portion 22b which is inclined at a slight angle to, and interconnects, the first two portions to form a continuous slot with a central offset.

It will thus be seen that as the seat part rises and falls, the resulting movement of the plate along the guide from a central position in which the guide roller is at the mid-length position of the slot will cause the guide roller 20, and hence the actuating member 18, to be swung in one or other direction away from its central position. This displacement of the actuating member will result in bending of the leaf spring and the application of a biasing force urging the compression roller towards one end of the peristaltic tube. The movement of the compression roller will be damped by the construction of the tube slowing down the flow of fluid towards the opposite end of the tube and hence will damp the movement of the slide member of the slide valve.

In order to adjust the amount of damping, a plate 24 extending alongside the peristaltic tube on the opposite side thereof from the roller, is movable, by means of an adjusting screw 25, towards and away from the roller to increase or decrease the constriction in the tube.

Reference has been made herein to an air-suspension system, but it will be understood that although atmospheric air will normally be used, the word "air" is used herein generically and is intended to include any other suitable gas or mixture of gases.

What we claim is:

1. A leveling valve for use in an air-suspension system of a vehicle seat, comprising an actuating member movable in response to upward and downward movement of a seat part of the vehicle seat relative to a base part thereof, a closed flexible tube containing a fluid, a roller arranged to roll along the outside of the tube and biased to press against and indent the tube thus forming a constriction in the tube, said constriction being effective to restrict flow of the fluid along the tube and thereby damp the movement of the roller along the tube, a spring coupling connecting the roller to said actuating member, and an air-supply valve having a flow control member responsive to the position of the roller to control the flow of air through the valve.

2. A valve according to claim 1 wherein the side of the tube opposite the roller abuts a support which is movable towards or away from the roller to vary the constriction and thereby vary the damping effect.

3. A valve according to claim 1 wherein the flow control member is movable between a position in which it connects a compressed-air inlet with an air-flow outlet to the seat and a position in which it connects said compressed-air inlet with a vent to atmosphere.

4. A leveling valve, for use in an air-suspension system of a vehicle seat, comprising an air-supply valve having a flow control member, an actuating member movable in response to upward and downward movement of a seat and connected to the flow control member of the valve via a spring coupling, and a damper connected to the flow control member and operative to load the spring coupling, the damper comprising a closed fluid container having a flexible wall and a variable constriction dividing the interior of the container into two chambers, and actuating means movable with the flow control member to flex said wall and thereby cause fluid to flow through said constriction and so damp any sudden movement of the flow control member.

5. A leveling valve according to claim 4 wherein said actuating means comprise a roller which is spring-urged against said flexible wall to indent the wall and produce said constriction in the fluid container, said roller being movable in opposite directions along said wall to cause said fluid to flow through the constriction.

6. A valve according to claim 4 wherein the roller is mounted on a pivoted arm, said spring coupling being connected between the pivoted arm and said actuating member.

7. A valve according to claim 4 wherein a control coupling movable in response to movement of the seat is connected to the actuating member and is operative to move it to opposite sides of a central position as the seat moves to opposite sides of a ride position.

* * * * *